US010633985B2

(12) United States Patent
Garcia-Crespo et al.

(10) Patent No.: US 10,633,985 B2
(45) Date of Patent: Apr. 28, 2020

(54) SYSTEM HAVING BLADE SEGMENT WITH CURVED MOUNTING GEOMETRY

(75) Inventors: Andrés Jose Garcia-Crespo, Greenville, SC (US); Patrick Daniel Noble, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1167 days.

(21) Appl. No.: 13/532,713

(22) Filed: Jun. 25, 2012

(65) Prior Publication Data
US 2013/0343895 A1     Dec. 26, 2013

(51) Int. Cl.
*F01D 5/28* (2006.01)
*F01D 5/30* (2006.01)

(52) U.S. Cl.
CPC .............. *F01D 5/284* (2013.01); *F01D 5/30* (2013.01); *F05D 2250/71* (2013.01); *Y02T 50/672* (2013.01)

(58) Field of Classification Search
CPC ........ F01D 5/3084; F01D 5/282; F01D 5/284; F01D 5/30; F01D 5/3007; F01D 5/303; F01D 5/3038; F01D 5/3046; F05D 2250/71; F05D 2250/711; F05D 2250/712; F05D 2300/603; F05D 2300/6033
USPC .................. 416/215, 219 R, 220 R, 221, 239
See application file for complete search history.

(56) References Cited

U.S. PATENT DOCUMENTS

| | | | | |
|---|---|---|---|---|
| 2,317,338 A | | 4/1943 | Rydmark | |
| 2,656,146 A | * | 10/1953 | Sollinger | B21D 53/78 29/509 |
| 2,769,611 A | * | 11/1956 | Schwarzkopf | F01D 5/066 29/447 |
| 2,868,441 A | * | 1/1959 | Reutt | 416/230 |
| 2,967,043 A | * | 1/1961 | Dennis | F01D 5/147 416/193 A |
| 3,679,324 A | * | 7/1972 | Stargardter | 416/229 R |
| 3,720,480 A | * | 3/1973 | Plowman et al. | 416/220 R |
| 3,752,600 A | * | 8/1973 | Walsh | F01D 5/282 415/217.1 |
| 3,867,069 A | * | 2/1975 | Bussell | F01D 5/3007 416/193 A |

(Continued)

FOREIGN PATENT DOCUMENTS

CN    103510944 A    1/2014
EP    2423440 A2    2/2012

(Continued)

OTHER PUBLICATIONS

U.S. Appl. No. 13/448,238, filed Apr. 16, 2012, McMurray et al.

(Continued)

*Primary Examiner* — David E Sosnowski
*Assistant Examiner* — Wayne A Lambert
(74) *Attorney, Agent, or Firm* — Fletcher Yoder, P.C.

(57) ABSTRACT

A system includes a blade segment having a blade and a mounting segment coupled to the blade. Additionally, the mounting segment includes a first contact face and a second contact face, wherein the first and second contact face are concave with respect to a longitudinal axis of the blade segment. To reduce stresses within the mounting segment, the mounting segment further includes a lower face coupling the first contact face and the second contact face, wherein the lower face is convex across the longitudinal axis of the blade segment.

13 Claims, 3 Drawing Sheets

(56) References Cited

U.S. PATENT DOCUMENTS

| | | | |
|---|---|---|---|
| 3,942,231 A * | 3/1976 | Whitaker | 29/889.7 |
| 4,040,770 A | 8/1977 | Carlson | |
| 4,045,149 A * | 8/1977 | Ravenhall | 416/135 |
| 4,094,615 A * | 6/1978 | Glenn | 416/215 |
| 4,142,836 A * | 3/1979 | Glenn | F01D 5/147 |
| | | | 416/193 A |
| 4,169,694 A * | 10/1979 | Sanday | F01D 5/3007 |
| | | | 416/219 R |
| 4,207,029 A * | 6/1980 | Ivanko | 416/241 B |
| 4,417,854 A * | 11/1983 | Cain | F01D 5/284 |
| | | | 416/219 R |
| 4,595,340 A * | 6/1986 | Klassen et al. | 416/193 A |
| 4,645,425 A * | 2/1987 | Morrison, Jr. | 416/215 |
| 4,790,723 A * | 12/1988 | Wilson et al. | 416/220 R |
| 4,995,788 A | 2/1991 | Turnberg | |
| 5,137,420 A * | 8/1992 | Sigworth et al. | 415/170.1 |
| 5,141,401 A * | 8/1992 | Juenger et al. | 416/219 R |
| 5,183,389 A | 2/1993 | Gilchrist et al. | |
| 5,257,909 A * | 11/1993 | Glynn et al. | 416/220 R |
| 5,275,536 A * | 1/1994 | Stephens et al. | 416/248 |
| 5,292,231 A | 3/1994 | Lauzeille | |
| 5,330,324 A | 7/1994 | Agram et al. | |
| 5,435,694 A * | 7/1995 | Kray et al. | 416/219 R |
| 5,492,447 A * | 2/1996 | Mannava et al. | 415/200 |
| 6,033,185 A * | 3/2000 | Lammas et al. | 416/193 A |
| 6,290,466 B1 * | 9/2001 | Ravenhall et al. | 416/229 A |
| 6,375,429 B1 | 4/2002 | Halila et al. | |
| 6,536,109 B2 * | 3/2003 | Berthelet | B24B 1/04 |
| | | | 29/889.1 |
| 6,592,330 B2 * | 7/2003 | Leeke et al. | 416/219 R |
| 6,773,234 B2 * | 8/2004 | Sinha et al. | 416/219 R |
| 6,899,526 B2 * | 5/2005 | Doloresco et al. | 416/238 |
| 6,945,754 B2 * | 9/2005 | DiBella | 416/219 R |
| 7,306,826 B2 * | 12/2007 | Subramanian et al. | 427/249.2 |
| 7,329,101 B2 * | 2/2008 | Carper et al. | 416/219 R |
| 7,597,838 B2 | 10/2009 | Subramanian et al. | |
| 8,888,459 B2 * | 11/2014 | Noble | 416/193 A |
| 2004/0062655 A1 | 4/2004 | Potter et al. | |
| 2005/0158171 A1 * | 7/2005 | Carper et al. | 415/200 |
| 2006/0283014 A1 | 12/2006 | Subramanian et al. | |
| 2006/0284337 A1 | 12/2006 | Subramanian et al. | |
| 2008/0025843 A1 * | 1/2008 | Scope | F01D 5/02 |
| | | | 416/204 A |
| 2008/0187441 A1 * | 8/2008 | Schreiber | B29C 70/202 |
| | | | 416/229 R |
| 2010/0068063 A1 | 3/2010 | Berg et al. | |
| 2011/0027064 A1 | 2/2011 | Pal et al. | |
| 2011/0052387 A1 | 3/2011 | Kneeland et al. | |
| 2011/0171018 A1 | 7/2011 | Garcia-Crespo | |
| 2011/0223027 A1 | 9/2011 | Klinetob et al. | |
| 2011/0243746 A1 | 10/2011 | Liotta et al. | |
| 2012/0051924 A1 | 3/2012 | Garcia-Crespo et al. | |
| 2012/0073304 A1 | 3/2012 | Butkiewicz et al. | |

FOREIGN PATENT DOCUMENTS

| | | |
|---|---|---|
| GB | 2293212 A | 3/1996 |
| JP | H06-137103 A | 5/1994 |
| JP | H07-189606 A | 7/1995 |
| JP | 2004-360551 A | 12/2004 |
| JP | 2008-144624 A | 6/2008 |

OTHER PUBLICATIONS

EP Search Report issued in connection with corresponding EP Patent Application No. 13165417.0 dated Oct. 17, 2013.

Unofficial English translation of Chinese Office Action issued in connection with corresponding CN Application No. 201310147234.4 dated Sep. 2, 2015.

GOST 23537-79, Vanes of aircraft axial-flow compressors and turbines, Moscow, "Izdatelstvo standartov," pp. 1-70 (1979).

Kuznetsov, S.A., "Great Dictionary of the Russian Language," Saint-Petersburg, Norint, pp. 1-14 (2000).

Office Action issued in connection with corresponding RU Application No. 2013118665 dated Feb. 7, 2017.

Notification of Reasons for Refusal issued in connection with corresponding JP Application No. 2013-089881 dated Mar. 14, 2017.

Search Report issued in connection with corresponding JP Application No. 2013-089881 dated Mar. 16, 2017.

* cited by examiner

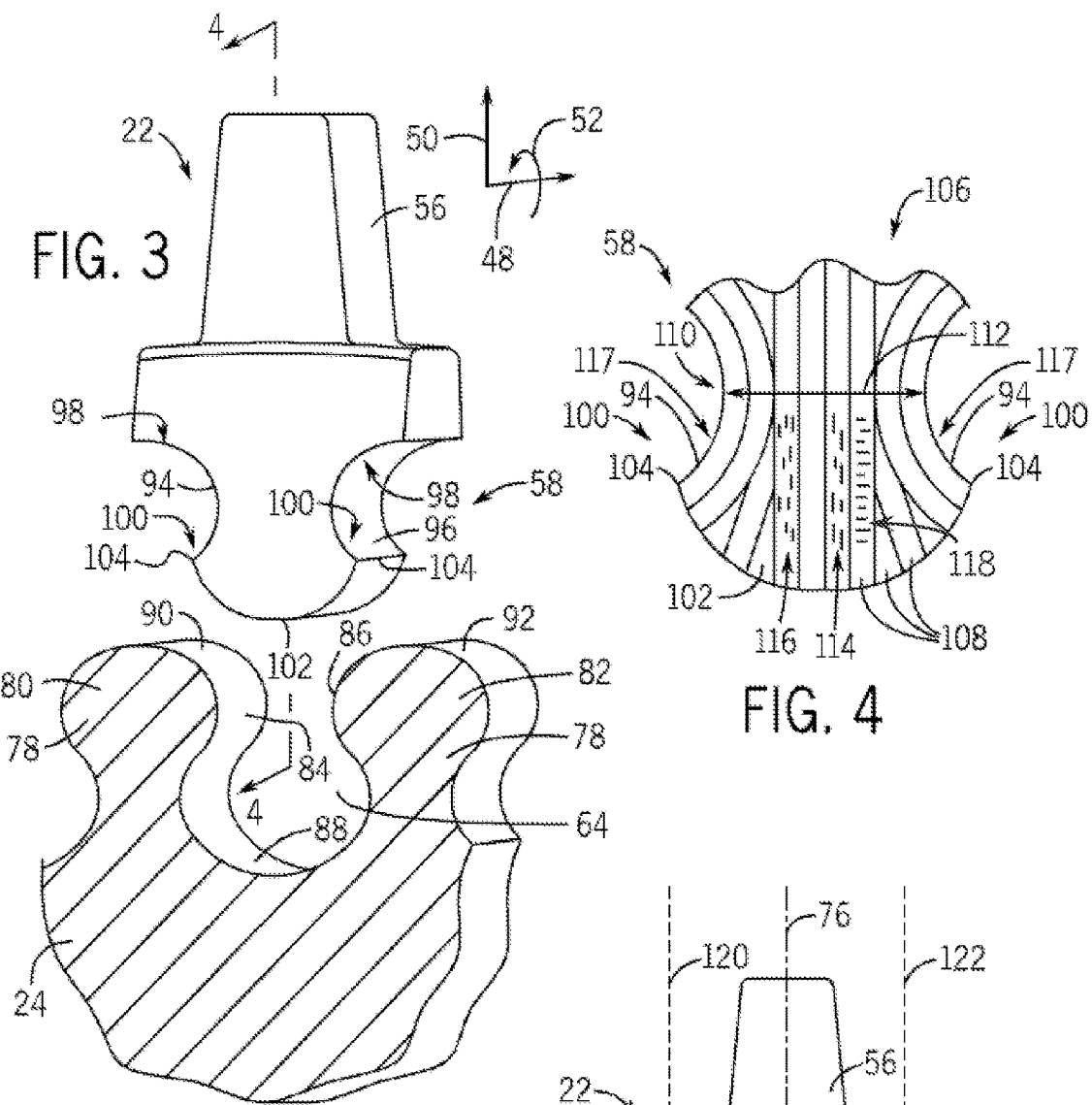
FIG. 3
FIG. 4
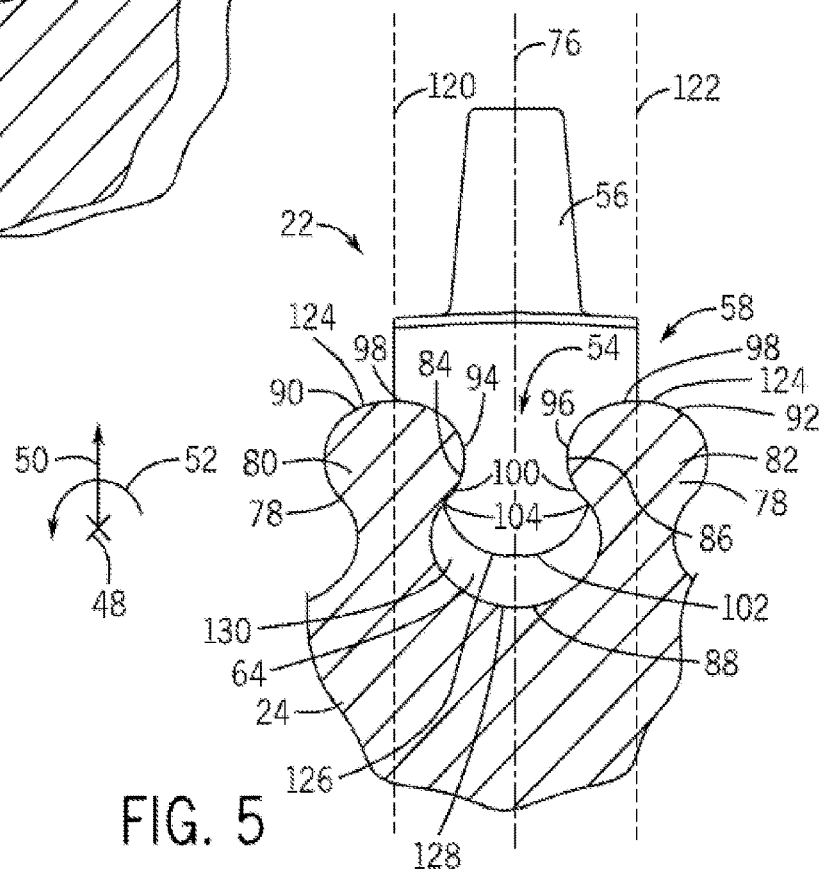
FIG. 5

US 10,633,985 B2

SYSTEM HAVING BLADE SEGMENT WITH CURVED MOUNTING GEOMETRY

This invention was made with Government support under contract number DE-FC26-05NT42643 awarded by the Department of Energy. The Government has certain rights in this invention.

BACKGROUND OF THE INVENTION

The subject matter disclosed herein relates to turbomachine blades. More particularly, the subject matter disclosed herein relates to rotor interface geometry in turbomachine composite blades.

Turbomachines, such as compressors and turbines, include blades that rotate about a shaft or rotor to transfer energy between the rotor and a fluid. For example, turbine engines provide thrust to power airplanes, ships, and generators. The blades may be generally supported by the rotor. For example, the turbomachine blades may be attached to or mounted in the rotor. During operation of the turbomachine, the blades may experience high stresses due to rapid rotation of the blades and/or high operating temperatures. Unfortunately, the high stresses may cause the blades to degrade and, in certain situations, mechanically fail.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a blade segment having a blade and a mounting segment coupled to the blade, wherein at least a portion of the mounting segment is configured to insert within a slot of a rotor to form a joint. Additionally, the mounting segment includes a first contact face and a second contact face each having a proximal end and a distal end, wherein each proximal end is configured to be inserted within the slot and each distal end is configured to remain outside of the slot when the joint is formed. The mounting segment further includes a lower face coupling the respective proximal ends of the first and second contact faces, wherein the lower face projects generally radially away from the blade.

In a second embodiment, a system includes a composite turbomachine blade segment having a blade and a mounting segment coupled to the blade. Additionally, the mounting segment includes a first contact face and a second contact face, wherein the first and second contact faces are concave with respect to a longitudinal axis of the turbomachine blade segment. The mounting segment further includes a lower face coupling the first contact face and the second contact face, wherein the lower face is curved away from the blade across the longitudinal axis of the turbomachine blade segment.

In a third embodiment, a system includes a turbomachine rotor having a plurality of slots spaced circumferentially about the turbomachine rotor and a plurality of disk posts spaced circumferentially about the rotor. Additionally, each disk post separates a first slot from a second slot of the plurality of slots, and each disk post comprises a first retaining surface configured to engage a first portion of a first turbomachine blade segment within the first slot and a second retaining surface configured to engage a second portion of a second turbomachine blade segment within the second slot, and the first and second retaining surfaces are coupled via a top surface that is curved away from a rotational axis of the turbomachine rotor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a perspective view taken within line 3-3 of FIG. 2 and illustrating a turbomachine blade segment with a curved mounting segment and a partial perspective view of a slot of the rotor configured to retain the curved mounting segment, in accordance with an embodiment of the present disclosure;

FIG. 4 is a partial cross-sectional view of the curved mounting segment taken along line 4-4 of FIG. 3, illustrating a configuration of plies, in accordance with an embodiment of the present disclosure;

FIG. 5 is a partial cross-sectional axial view taken within line 3-3 of FIG. 2 and illustrating a turbomachine blade segment with a curved mounting segment inserted within a slot of the rotor, in accordance with an embodiment of the present disclosure;

DETAILED DESCRIPTION OF THE INVENTION

Figure 1:
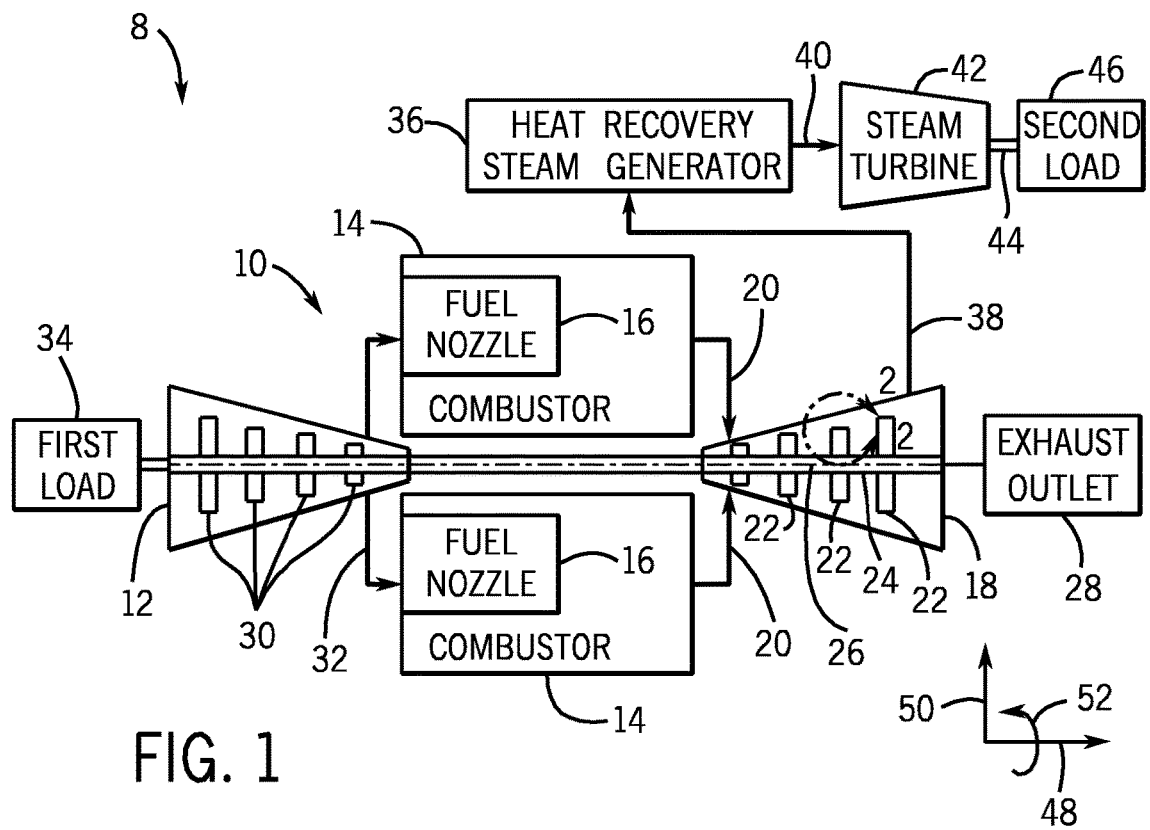
FIG. 1 is a schematic diagram of an embodiment of a combined cycle power generation system having a gas turbine system that may utilize turbomachine blade segments having curved mounting segments, a steam turbine, and a heat recovery steam generation (HRSG) system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed above, a turbomachine blade segment, and more specifically, a turbomachine blade mounting segment, may experience stresses during operation of the turbomachine, which may degrade the blade segment and/or the mounting segments. Specifically, as the rotor rotates, the mounting segments may experience a high compressive load, which may result in high tensile stresses within the center of the minimum neck area of the mounting segment. The tension may cause the mounting segments to crack or separate. The cracks or separations may weaken the mounting segments and may be a gateway for dirt or moisture, which may further weaken the mounting segment. Thus, it is now recognized that it may be desirable to provide a turbomachine blade segment designed to reduce or minimize the tension within the mounting segment.

With the foregoing in mind, the disclosed embodiments include a curved turbomachine blade mounting segment for coupling a turbomachine blade to a rotor of a turbomachine. Specifically, the bottom of the mounting segment may be curved outwardly with respect to the blade (e.g., arc-shaped or mushroom-shaped). The curvature of the mounting segment may serve to increase the load-bearing ability of the turbomachine blade segment and counter the loads imposed by the pull of the blade. Additionally, certain embodiments include a turbomachine rotor that includes slots and/or disk posts configured to engage with the mounting segment. One or more surfaces of the slots and/or disk posts may also be curved (e.g., arc-shaped or mushroom-shaped). As a result, stresses experienced by the mounting segment, the rotor of the turbomachine, and the turbomachine blade may be reduced, thereby increasing the useful life of the mounting segment, the rotor, and the turbomachine blade. It should be noted, that while the present embodiments are discussed within the context of turbomachines with turbomachine blade segments mounted to a rotor, they are also applicable to any system having similar attachments. For example, the present embodiments are also applicable to propellers, such as in airplanes, wind turbines, and the like.

Turning now to the drawings, FIG. 1 is a schematic block diagram of an embodiment of a combined cycle system 8 having various turbomachines that are equipped with improved blade mounting systems (e.g., dovetail joints). Specifically, the turbomachines include turbomachine blade segments with curved mounting segments (e.g., a first dovetail portion of a dovetail joint), which may be coupled to a slot or recess (e.g., a second dovetail portion of a dovetail joint) of a rotor. As shown, the combined cycle system 8 includes a gas turbine system 10 having a compressor 12, combustors 14 having fuel nozzles 16, and a turbine 18. As discussed in further detail below, the compressor 12 produces compressed air and provides the compressed air to the combustors 14. Similarly, the fuel nozzles 16 route a liquid fuel and/or gas fuel, such as natural gas or syngas, into the combustors 14. The combustors 14 ignite and combust a fuel-air mixture produced from mixing the compressed air and the liquid and/or gas fuel, and then pass resulting hot pressurized combustion gases 20 into the turbine 18.

Figure 2:
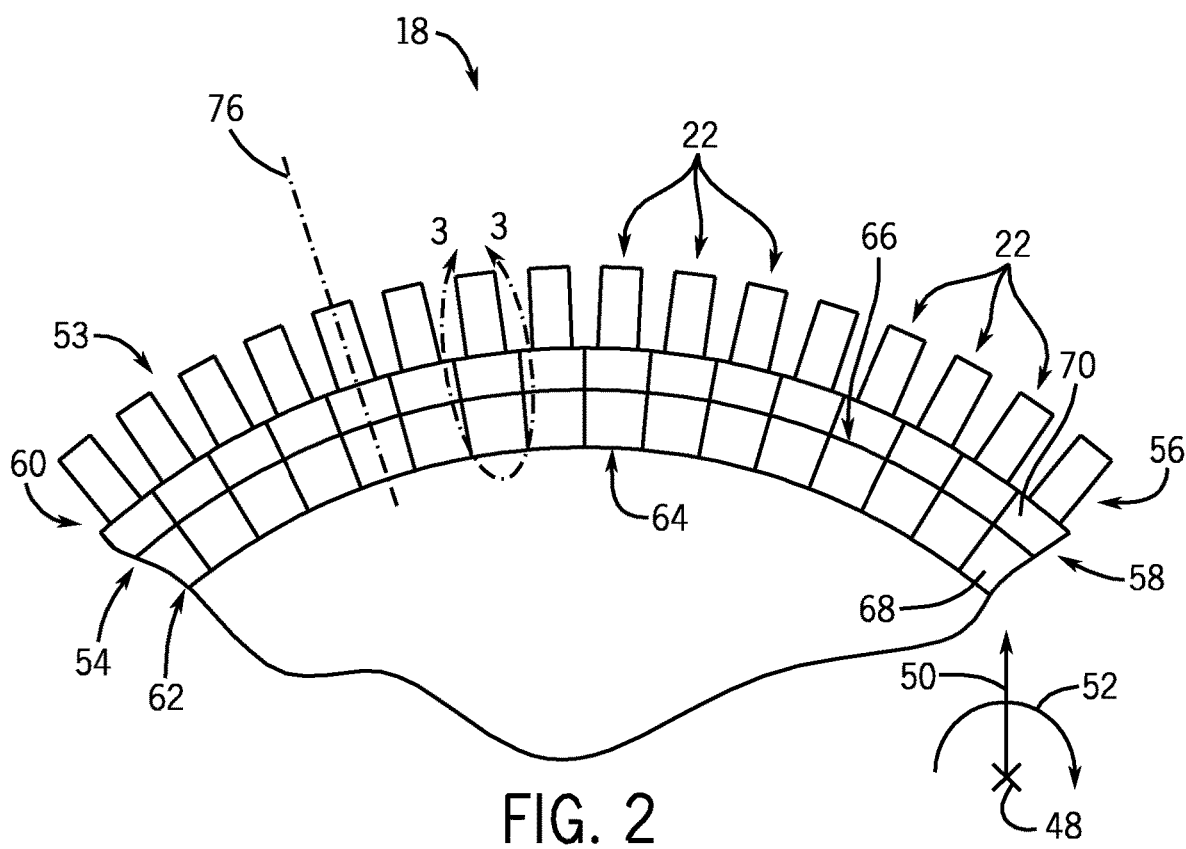
FIG. 2 is a partial cross-sectional axial view taken within line 2-2 of FIG. 1 and illustrating an embodiment of a rotor of the turbine having circumferentially mounted turbomachine blade segments with curved mounting segments, in accordance with an embodiment of the present disclosure.

In the turbine 18, the hot pressurized combustion gases pass over a series of turbomachine blade segments 22, which are coupled to a rotor 24. As discussed in further detail below with respect to FIG. 2, each turbomachine blade segment 22 is coupled to the rotor 24 via a respective curved mounting segment (FIG. 2). Thus, as the combustion gases 20 pass over the turbomachine blade segments 22 in the turbine 18, the blade segments 22 cause the rotor 24 to rotate along a rotational axis 26. Eventually, the combustion gases 20 exit the turbine 18 via an exhaust outlet 28 (e.g., exhaust duct, exhaust stack, silencer, etc.).

In the illustrated embodiment, the compressor 12 includes compressor blades 30. The compressor blades 30 within the compressor 12 are also coupled to the rotor 24, for example using curved mounting segments in accordance with the present disclosure. The compressor blades 20 rotate as the rotor 24 is driven into rotation by the turbomachine blade segments 22, as described above. Thus, at least a portion of the work performed by the hot combustion gases on the turbomachine blade segments 22 may be used to drive the compressor 12. As the compressor blades 30 rotate within the compressor 12, the compressor blades 30 compress air from an air intake into pressurized air 32, which is routed to the combustors 14, the fuel nozzles 16, and other portions of the combined cycle system 8. The fuel nozzles 16 then mix the pressurized air and fuel to produce a suitable fuel-air mixture, which combusts in the combustors 14 to generate the combustion gases 20 to drive the turbine 18. Further, the rotor 24 may be coupled to a first load 34, which may be powered via rotation of the rotor 24. For example, the first load 34 may be any suitable device that may generate power via the rotational output of the combined cycle system 8, such as a power generation plant or an external mechanical load. For instance, the first load 34 may include an electrical generator, a propeller of an airplane, and so forth.

The system 8 may further include a heat recovery steam generator (HRSG) system 36. Heated exhaust gas 38 from the turbine 18 is transported into the HRSG system 36 to heat water to produce steam 40 used to power a steam turbine 42. The HRSG system 36 may include various economizers, condensers, evaporators, heaters, and so forth, to generate and heat the steam 40 used to power the steam turbine 42. The steam 40 produced by the HRSG system 36 passes over turbine blades of the steam turbine 42. The turbine blades of the steam turbine 42 may, for example, be the turbomachine blade segments 22 having the curved mounting segments. As the steam 40 passes through the turbine blades in the steam turbine 42, the steam turbine 42 is driven into rotation, which causes the shaft 44 to rotate, thereby powering a second load 46.

In the following discussion, reference may be made to various directions or axes, such as an axial direction 48 along the rotational axis 26, a radial direction 50 away from the axis 26, and a circumferential direction 52 around the axis 26 of the turbine 18 or the steam turbine 42. Additionally, as mentioned above, while the mounting segments (e.g., a first dovetail portion of a dovetail joint) described below may be used with any of a variety of turbomachines (e.g., compressors 12, gas turbines 18, or steam turbines 42) or other machinery that uses blades, the following discussion describes curved mounting segments (e.g., a first dovetail portion of a dovetail joint) in the context of the turbine 18 (e.g., a gas turbine).

FIG. 2 is a partial cross-sectional axial view of the turbine 18 taken within line 2-2 of FIG. 1. In particular, FIG. 2 illustrates an embodiment of a single stage 53 of the turbine 18 having turbomachine blade segments 22 coupled to the rotor 24 via joints 54 (e.g., dovetail joints). As noted above, each blade segment 22 includes a turbine blade 56 and a mounting segment 58. Additionally, each blade segment 22 has a longitudinal axis 76. Each mounting joint 54 includes a first joint portion 60 (e.g., a first dovetail portion) disposed on each blade segment 22, and a second joint portion 62 (e.g., a second dovetail portion) disposed on the rotor 24. For example, the first joint portion 60 may be a male joint portion and the second joint portion 62 may be a female joint portion, or vice versa. In the illustrated embodiment, the first joint portion 60 comprises the mounting segment 58 that is male, and the second joint portion 62 comprises a recess or slot 64 that is female.

Specifically, each of the mounting segments 58 is partially disposed within one of the slots 64 (e.g., an axial slot) formed in an outer surface 66 of, and circumferentially 52 spaced about, the rotor 24. For example, a plurality of the slots 64 may encircle the rotor 24. As illustrated, a first portion 68 of each mounting segment 58 is disposed within the slot 64 of the rotor 24, while a second portion 70 of each mounting segment 58 extends in the radial direction 50 outward from the outer surface 66 of the rotor 24 and is coupled to the respective turbine blade 56. Thus, the second portion 70 of each mounting segment 58 may be disposed completely outside of the slot 64, or partially inside of the slot 64. To install each turbomachine blade segment 22, each mounting segment 58 may be inserted along the axial direction 48 into a respective slot 64.

FIG. 3 is an exploded perspective view taken within line 3-3 of FIG. 2, illustrating an embodiment of the turbomachine blade segment 22 in which the turbine blade 56 and the mounting segment 58 are a single piece (e.g., are integrally formed). FIG. 3 also depicts the relative arrangement of the geometries of the mounting segment 58 and the slot 64 of the rotor 24. For instance, as noted above, the mounting segment 58 is configured to be at least partially inserted into the slot 64 of the rotor 24. It should be noted that while it the mounting segment 58 is illustrated and described in the context of being axially 48 inserted into the slot 64, it is also contemplated that the mounting segment 58 may be radially 50 inserted into a circumferential slot 64 of the rotor 24. As depicted, the mounting segment 58 and the slot 64 may have complimentary geometries that enable the turbomachine blade segment 22 and the rotor 24 to couple to one another.

In the illustrated embodiment, the slot 64 is formed in between two disk posts 78. The disk posts 78 are spaced in the circumferential direction 52 about the rotor 24 and extend in the radial direction 50 outward from the rotor 24. The rotor 24 may include a plurality of disk posts 78 defining a plurality of slots 64, which may be configured to couple with a plurality of mounting segments 58. Accordingly, while specific slots 64 or disk posts 78 may be discussed for clarity, that the embodiments discussed below may be applicable to any one of the plurality of slots 64 or disk posts 78.

With the foregoing in mind, in the illustrated embodiment, the slot 64 is formed as a spacing between a first disk post 80 and a second disk post 82. The first disk post 80 includes a first retaining surface 84, and the second disk post includes a second retaining surface 86, which are connected by a bottom surface 88. The retaining surfaces 84 and 86 are configured to abut portions of the mounting segment 58 such that the mounting segment 58 is retained within the slot 64. The particular configuration of the first and second retaining surfaces 84 and 86 is discussed in further detail below. The bottom surface 88 may be disposed about the inner bottom of the slot 64, and the retaining surfaces 84 and 86 may be disposed about the inner sides of the slot 64. Additionally, the first retaining surface 84 may be connected with a top surface 90 of the first disk post 80, and the second retaining surface 86 may be connected with a top surface 92 of the second disk post 82. While bottom surface 88 is depicted as a surface that is continuous with the first and second retaining surfaces 84 and 86 (e.g., not separated by ends or corners), it should be noted that the disk posts 80 and 82 may be connected by more than one surface, in which each surface is separated from another by a corner.

The disk posts 78 may be configured to engage at least a portion of the mounting segment 58 when the joint 54 is formed. That is, the disk posts 78 may be designed to retain at least a portion of the mounting segment 58 within the slot 64 when the turbomachine blade segment 22 is installed in the turbine 18. For example, the first and second retaining surfaces 84 and 86, as well as the top surfaces 90 and 92, may be configured to abut portions of the mounting segment 58. In particular, in the illustrated embodiment, the first and second retaining surfaces 84 and 86 are configured to abut a first contact face 94 and a second contact face 96 of the mounting segment 58. As defined herein, a face is defined as a surface that is delineated by ends (e.g., corners). Furthermore, as defined herein, a contact face is a surface in which at least a portion of the surface abuts a disk post when the turbine is spinning Additionally, each contact face 94 and 96 includes a distal end 98 configured to remain outside of the slot 64 and a proximal end 100 configured to be inserted into the slot 64. In accordance with present embodiments, when the joint 54 is formed (FIG. 2) and the turbine 18 is spinning, the first retaining surface 84 may abut at least the proximal end 100 of the first contact face 94. Similarly, the second retaining surface 86 may abut at least the proximal end 100 of the second contact face 96. Additionally, the top surface 90 may abut at least the distal end 98 of the first contact face 94, while the top surface 92 may abut at least the distal end 98 of the second contact face 96.

The mounting segment 58 may further include a lower face 102 generally connecting the first and second contact faces 94, 96. The lower face 102 may be separated from the first contact face 94 and the second contact face 96 by corners 104. Specifically, each corner 104 may be an angled portion where two faces converge and, more specifically, each corner 104 may be a transition point from an inwardly curved face (e.g., the first or second contact face 96) to an outwardly curved face (e.g., the lower face 102). In the illustrated embodiment, the lower face 102 is curved to create a lobe, or U-shaped protrusion, on the bottom of the mounting segment 58. Similarly, the bottom surface 88 and the top surfaces 90, 92 may be curved. The curved surfaces may enhance the load-bearing capability of the mounting segment 58, when compared to non-curved mounting segments (e.g., angled and/or flat) to stiffen the structure of the turbomachine blade segment 22, and additionally the disk posts 78, to reduce blade strain (e.g., due to interlaminar tension (ILT)). Indeed, as discussed in further detail below, any of the above listed surfaces may be modified with various degrees of curvature to reduce blade strain.

As discussed above, the turbomachine blade segment 22 may experience stresses. These stresses may increase the likelihood or the magnitude of cracks in the mounting segment 58 during operation of the turbine 18 (FIG. 1). Generally, metal turbomachine blade segments 22 experience stresses in the radial direction 50 (e.g., radially upward). In contrast, composite turbomachine blades 22 are more susceptible to different types of stresses, such as ILT. Indeed, ILT may be particularly detrimental for composite blades, which will be described in more detail below. However, composite turbomachine blade segments 22 having composite mounting segments 58, such as ceramic matrix composite (CMC) turbomachine blade segments 22, may be advantageous for use within components that are placed within a hot gas path, such as in an engine, as they may be capable of operating without receiving cooling air inside the hot gas path of a gas turbine. Thus, the mounting segment 58 may be a composite assembly of one or more laminated plies.

FIG. 4 is a partial cross-sectional view of the mounting segment 58 taken along line 4-4 of FIG. 3, illustrating an embodiment of a composite assembly 106 of laminated plies 108 forming a bulk of the mounting segment 58. In some embodiments, as illustrated, the laminated plies 108 may extend in the radial direction 50 from the proximal end 100 to the distal end 98 (FIG. 3) of the mounting segment 58. Further, the laminated plies 108 may be oriented substantially parallel with respect to one another, and may include a plurality of fibers 114 disposed within a matrix, as discussed below.

The laminated plies 108 may have characteristics (e.g., geometry and/or material composition) which may be uniform or non-uniform within or among the mounting segment 58. For example, the stress or compression loading of the mounting segment 58 may not be uniform in the radial 48, axial 50, or circumferential 52 directions, and thus, the characteristics of the laminated plies 108 may be designed to vary within the mounting segment 58.

In certain embodiments, the material composition of the laminated plies 108 may be designed for the mounting segment 58 to withstand high mechanical or thermal stresses. For example, the laminated plies 108 may be constructed of a ceramic, a metal, a polymer, a fiberglass, an epoxy, another suitable material, or any combination thereof. In certain embodiments, the laminated plies 108 may be a ceramic matrix composite. For example, the material composition may alternate from ceramic to metal between adjacent laminated plies 108. In other embodiments, as noted above, the laminated plies 108 may be a CMC material in which a plurality of fibers 114 (e.g., silicon carbide fibers) are disposed within a matrix material, which may be the same as the material used to construct the fibers 114, contain one or more components of the materials used to construct the fibers 114 (e.g., silicon/silicon-carbide), or may be different than the fibers 114. Additionally, in embodiments where the laminated plies 108 include such fibers 114, the fibers 114 may have any relative orientation. For example, as illustrated, a first set of fibers 116 may have a first orientation while a second set of fibers 118 have a second orientation. Indeed, the first and second orientations may take on any geometric form and have any geometric relationship with respect to one another. Thus, the first and second sets of fibers 116, 118 may be oriented substantially parallel with respect to one another, crosswise with respect to one another (e.g., in a converging, diverging, orthogonal, or similar relationship), or may be oriented in an arcuate, circular, or semi-circular fashion. In certain embodiments, it may be desirable for the fibers 114 to be substantially aligned in the radial direction 50 within the mounting segment 58 so as to increase the ability of the mounting segment 58 to withstand shear, strain, and tension during operation.

While composite mounting segment 58 may be advantageous for at least the reasons set forth above, they may experience interlaminar stresses exceeding the tensile strength of the composite material. Specifically, as the composite turbine blade segment 22 spins, the composite mounting segment 58 may experience high ILT in a minimum neck area 110 of the mounting segment 58. More specifically, the strain may occur in a direction as indicated by arrow 112. The ILT may cause the laminated plies 108 to transversely separate or delaminate (e.g., in the circumferential direction 52). The separation of the laminated plies 108 may create or exacerbate preexisting cracks in the mounting segment 58. Furthermore, the mounting segment 58 may experience a high radial load along a portion 117 of the contact surfaces 94 and 96, which may rupture the laminated plies 114. To address these issues, the disclosed embodiments provide the curved mounting segments 58 and the disk posts 78 with varying degrees of curvature, which may function to stiffen the structure and reduce strain of the mounting segment 58, and thus reduce the stresses of the turbomachine blade segment 22.

FIG. 5 is a partial cross-sectional axial view, taken within line 3-3 of FIG. 2, of the turbomachine blade segment 22 and the slot 64, illustrating an embodiment of the mounting segment 58 and the disk posts 78. In the illustrated embodiment, the first pressure second contact face 94 and 96 of the mounting segment 58 are curved inwardly with respect to the longitudinal axis 76 of the turbomachine blade segment 22. Thus, in the illustrated embodiment, the first and second contact faces 94 and 96 are concave with respect to the longitudinal axis 76. Indeed, as defined herein, with respect to the mounting segment 58, concave is defined as curved toward the turbomachine blade segment 22, and convex is defined as curved away from the turbomachine blade segment 22. Accordingly, the first and second retaining surface 84 and 86, which may be configured to abut the first and second contact faces 94 and 96 when the joint 54 is formed, may also be concave with respect to the turbomachine blade segment 22. Furthermore, the first retaining surface 84 may be curved away from, or convex with respect to a longitudinal axis 120 of the first disk post 80. Similarly, the second retaining surface 86 may be curved away from a longitudinal axis 122 of the second disk post 82.

In the illustrated embodiment, each contact face 94 and 96 is curved from its distal end 98 to its proximal end 100, respectively. As such, each top surface 90 and 92 may also be curved to engage with the first and second contact faces 94 and 96, respectively. Specifically, each top surface 90 and 92 may be curved away from the rotational axis 26 of the rotor 24. In other words, each top surface 90 and 92 may be curved across the longitudinal axes 120 and 122, respectively. The longitudinal axes 120 and 122 may be substantially parallel to the longitudinal axis 76 of the turbomachine blade segment 58 when the joint 54 is formed. That is, the longitudinal axes 120 and 122 may be offset from the longitudinal axis 76 to the extent that there is some uncertainty in measurements. In other embodiments, the longitudinal axes 120 and 122 may not be parallel. In the illustrated embodiment, the top surfaces 90 and 92 are curved as arc surfaces 124. In one embodiment, the arc surfaces 124 are curved such that the peaks of the first and second disk post 80 and 82 (e.g., the farthest point from the rotation axis 26) substantially align with their longitudinal axes 120 and 122, respectively. Furthermore, the degree of curvature may vary for certain embodiments. For example, each arc surface 124 may be one-quarter, one-third, one-half, two-thirds, or three-quarters of a circle. Each arc surface 124 may have an arc angle greater than approximately 0° and less than approximately 270°. By way of non-limiting example, each arc surface 124 may have an arc angle between approximately 30° and 240°, 60° and 210°, 90° and 180°, or 120° and 150°.

In the illustrated embodiment, lower face 102 of the mounting segment 58 is also curved. Specifically, the lower face 102 is curved radially away from the turbomachine blade segment 22. More specifically, the lower face 102 is curved between the corners 104 to create a convex arc surface 126. The convex arc surface 126 is also concave with respect to the rotational axis 26 of the rotor 24. As noted above, the arc surface 126 is curved such that the nadir of the mounting segment 58 (e.g., the farthest point from the blade 56) substantially aligns with the longitudinal axis 76. The arc surface 126 may have a same or different degree of curvature as the arc surfaces 124. That is, the arc surface 126 may have an arc angle greater than approximately 0° and less than approximately 270°. By way of non-limiting example, the arc surface 126 may have an arc angle between approximately 30° and 240°, 60° and 210°, 90° and 180°, or 120° and 150°.

As discussed above, the curvature of the top surfaces 90 and 92 and the lower face 102 may be desirable to stiffen the structure of the turbomachine blade segment 22 when the joint 54 is formed. In particular, the curvature may act to increase the load bearing capability of the blade segment 22 and may counteract or reduce the ILT during operation. Furthermore, the degree of curvature may be related to load bearing capability. For example, an arc angle between 90° and 270° or 100° and 200°, may be optimal for load bearing capabilities.

In certain embodiments, the bottom surface 88 may also be curved, such that the bottom surface 88 curves inward toward the rotational axis 26 of the rotor 24. Indeed, it may be desirable for the geometry of the bottom surface 88 to substantially match the geometry of the lower face 102 to enable some movement between them while also providing a substantially uniform fit. Accordingly, in the illustrated embodiment, the bottom surface 88 has a geometry 128 substantially matching that of the convex arc surface 126. Furthermore, in the illustrated embodiment, the slot 64 is deeper than the inserted portion of the mounting segment 58, such that a cavity 130 may be disposed between the bottom surface 88 and the lower face 102 when the joint 54 is formed. In one embodiment, the cavity 130 may be configured to receive cooling air (e.g., compressed air) to enable cooling of the turbomachine blade segment 22. However, in certain embodiments, the slot 64 and the mounting segment 58 may be configured such that the cavity 130 is minimized, or such that the lower face 102 abuts the bottom surface 88.

Figure 6:
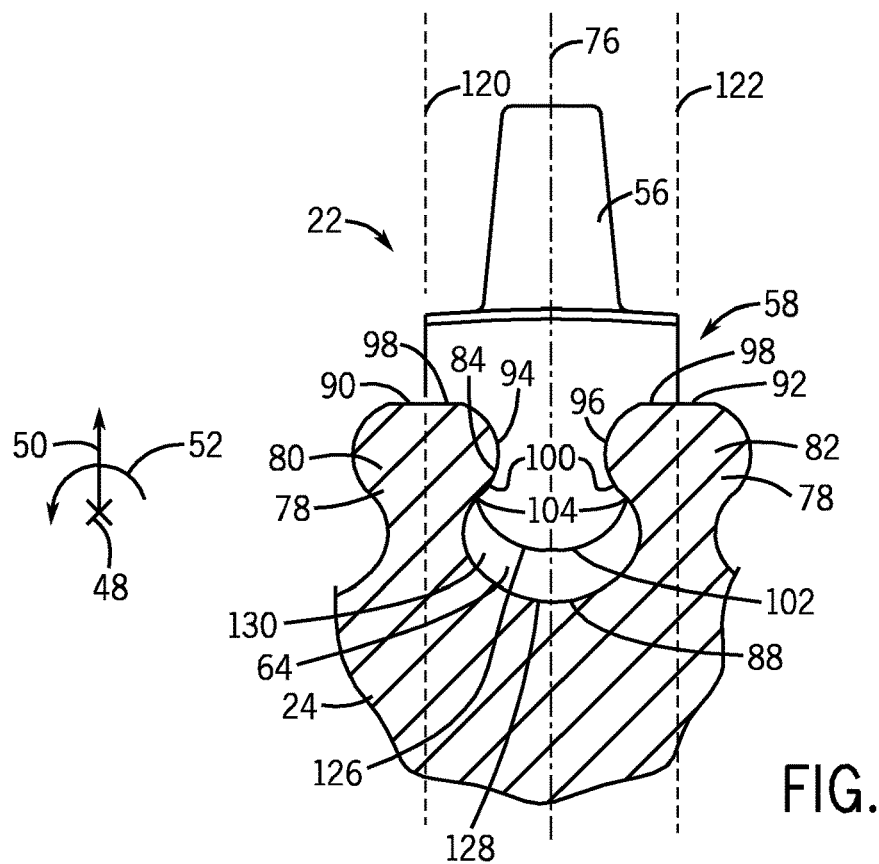
FIG. 6 is a partial cross-sectional axial view taken within line 3-3 of FIG. 2 and illustrating a turbomachine blade segment with a curved mounting segment inserted within a slot of the rotor, in accordance with an embodiment of the present disclosure.

FIG. 6 is a partial cross-sectional axial view, taken within line 3-3 of FIG. 2, of the turbomachine blade segment 22 and the slot 64, illustrating an embodiment of the mounting segment 58 and the disk posts 78. In the illustrated embodiment, the lower face 102 and the bottom surface 88 may be designed as the convex arc surfaces 126 and 128, respectively, as described with respect to FIG. 4. However, the top surfaces 90 and 92 may be substantially flat across the longitudinal axes 120 and 122, respectively. Accordingly, the distal ends 98 of the first and second contact faces 94 and 96 may also be flat to engage with the flat top surfaces 90 and 92, respectively.

Figure 7:
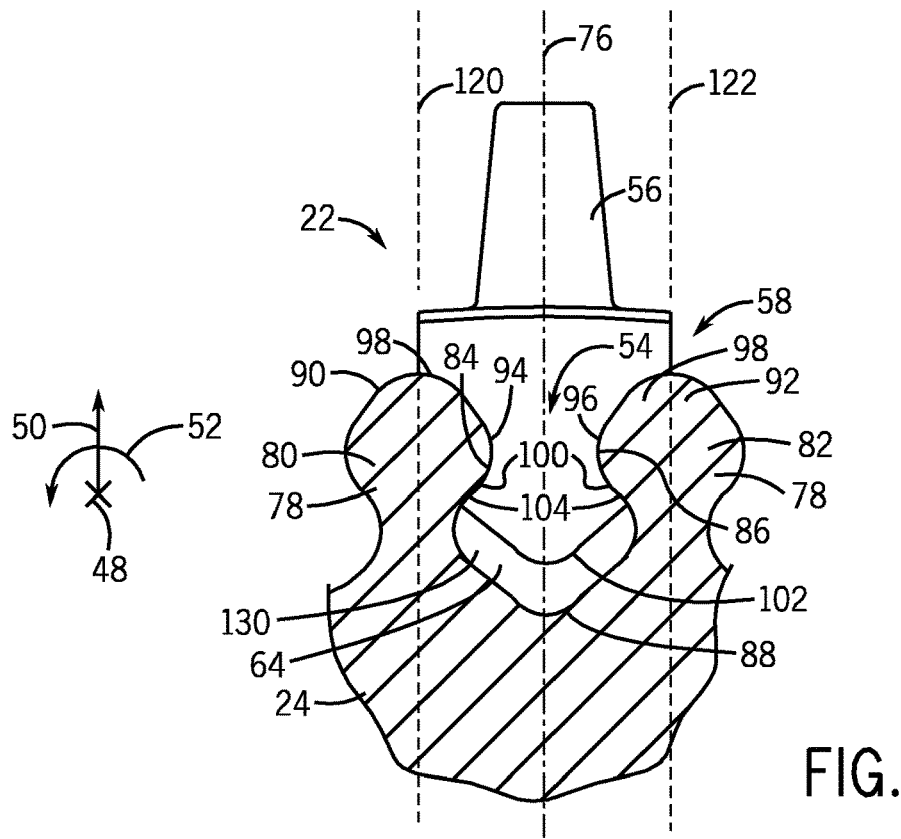
FIG. 7 is a partial cross-sectional axial view taken within line 3-3 of FIG. 2 and illustrating a turbomachine blade segment with a curved mounting segment inserted within a slot of the rotor, in accordance with an embodiment of the present disclosure.

FIG. 7 is a partial cross-sectional axial view, taken along line 3-3 of FIG. 2, of the turbomachine blade segment 22 and the slot 64, illustrating an embodiment of the mounting segment 58 and the disk posts 78. In the illustrated embodiment, the lower face 102 may project generally radially away from the turbomachine blade segment 22. That is, at least a portion of the lower face 102 may be curved outwardly with respect to the turbomachine blade segment 22, and portions of the lower face may be flat or slanted away with respect to the turbomachine blade segment 22. In certain embodiments, the lower face 102 may be curved, or convex, across the longitudinal axis 76. For example, the lower face 102 may be curved over 0 to 100, 10 to 90, 20 to 80, 30 to 70, or 40 to 60 percent of the lower face 102. Additionally, in the illustrated embodiment, the top surfaces 90 and 92 are also generally curved, such that at least a portion of each top surface 90 and 92 projects radially outward with respect to the rotation axis 26. Specifically, the top surfaces 90 and 92 are curved across the longitudinal axes 120 and 122, respectively. Furthermore, the top surfaces 90 and 92 may be curved over 0 to 100, 10 to 90, 20 to 80, 30 to 70, or 40 to 60 percent of their respective surface.

The bottom surface 88 may also be designed to project generally radially outward from the turbomachine blade segment 22. Similar to the lower face 102, at least a portion of the bottom surface 88 may be curved toward the rotational axis 26, and portions of the lower face may be flat or slanted inward with respect to the rotational axis 26. In certain embodiments, the bottom surface 88 may be curved, or convex, across the longitudinal axis 76, when the joint 54 is formed. Additionally, the longitudinal axis may substantially align with a central region 120 of the bottom surface 88 when the joint 54 is formed. In certain embodiments, the bottom surface 88 may be curved across the central region 120. Furthermore, the bottom surface 88 may be curved over 0 to 100, 10 to 90, 20 to 80, 30 to 70, or 40 to 60 percent of the bottom surface 88.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a rotor, comprising:
      a first disk post having a first retaining surface formed in an outer surface of the rotor;
      a second disk post having a second retaining surface formed in the outer surface of the rotor; and
      an axial slot formed in the outer surface of the rotor and disposed between the first and second retaining surfaces; and
   a composite blade segment, comprising:
      a blade; and
      an axial mounting segment coupled to the blade, wherein the axial mounting segment comprises a plurality of laminated plies, and wherein the axial mounting segment comprises:
         a first contact face having a first proximal end and a first distal end;
         a second contact face having a second proximal end and a second distal end, wherein the first and second proximal ends are configured to be inserted within the axial slot to form a joint, the first and second distal ends are configured to remain outside of the axial slot when the joint is formed, the first and second proximal ends are configured to abut the first retaining surface of the first disk post and the second retaining surface of the second disk post, respectively, when the first and second proximal ends are inserted into the axial slot and when a turbomachine having the composite blade segment is in operation; and a lower face coupling the first and second proximal ends of the first and second contact faces at respective first and second corners, wherein the lower face has a curved surface that curves radially away from the blade between the first and second corners, the first contact face has a first curved surface extending to or adjacent the first corner, and the second contact face has a second curved surface extending to or adjacent the second corner, and the first corner and the second corner are disposed at a maximum width of the axial mounting segment.

2. The system of claim 1, wherein each laminated ply of the plurality of laminated plies extends longitudinally within the axial mounting segment relative to a longitudinal axis of the composite blade segment, and the curved surface of the lower face is configured to reduce strain and separation of adjacent plies of the plurality of laminated plies in a direction crosswise to the longitudinal axis.

3. The system of claim 2, wherein the composite material comprises a ceramic matrix composite.

4. The system of claim 1, wherein the curved surface of the lower face has a constant radius extending to or adjacent the first and second corners.

5. The system of claim 1, wherein each of the first and second disk posts extends radially outward from a rotational axis of the rotor, the axial slot comprises a bottom surface formed in the outer surface of the rotor, the bottom surface connects the first and second retaining surfaces, and a longitudinal axis of the composite blade segment substantially aligns with a central region of the bottom surface when the joint is formed, and the bottom surface is curved across the central region toward the rotational axis of the rotor.

6. The system of claim 5, wherein a first geometry of the bottom surface substantially matches a second geometry of the curved surface of the lower face of the axial mounting segment.

7. The system of claim 1, wherein each ply of the plurality of laminated plies comprises a matrix material and a plurality of fibers disposed in the matrix material, one or more first plies of the plurality of laminated plies has the plurality of fibers extending along a first axis, one or more second plies of the plurality of laminated plies has the plurality of fibers extending along a second axis, and the first and second axes are crosswise to one another.

8. The system of claim 1, wherein the first contact face is concave between the first proximal end and the first distal end, the second contact face is concave between the second proximal end and the second distal end, and the curved surface of the lower face curves across a longitudinal axis of the composite blade segment.

9. The system of claim 8, wherein at least one of the plurality of laminated plies curves along the first contact face, and at least one of the plurality of laminated plies curves along the second contact face.

10. The system of claim 1, comprising a gas turbine engine having the rotor and the composite blade segment.

11. The system of claim 1, wherein the first retaining surface of the first disk post comprises a first convex portion that is configured to abut the first contact face from the first proximal end to the first distal end when the turbomachine is operation, the second retaining surface of the second disk post comprises a second convex portion that is configured to abut the second contact face from the second proximal end to the second distal end when the turbomachine is in operation, and the first and second distal ends are configured to abut a first outermost surface of the first disk post and a second outermost surface of the second disk post, respectively, when the turbomachine is in operation, wherein the first and second outermost surfaces are curved away from a rotational axis of the rotor.

12. The system of claim 11, wherein the axial slot is formed by the first retaining surface, the second retaining surface, and a bottom surface, and the bottom surface is connected to the first retaining surface and the second retaining surface without any corners.

13. The system of claim 1, wherein at least some plies of the plurality of laminated plies extend longitudinally within the axial mounting segment relative to a longitudinal axis of the composite blade segment.

* * * * *